United States Patent
Dyer

(10) Patent No.: US 10,774,674 B2
(45) Date of Patent: Sep. 15, 2020

(54) SET SCREW GAP CONTROL BETWEEN FIXED AND VARIABLE VANES

(71) Applicant: United Technologies Corporation, Farmington, CT (US)

(72) Inventor: David M. Dyer, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 60 days.

(21) Appl. No.: 16/130,042

(22) Filed: Sep. 13, 2018

(65) Prior Publication Data

US 2020/0088063 A1   Mar. 19, 2020

(51) Int. Cl.
*F01D 17/16* (2006.01)
*F01D 9/04* (2006.01)
*F01D 5/14* (2006.01)

(52) U.S. Cl.
CPC .......... *F01D 17/162* (2013.01); *F01D 9/041* (2013.01); *F01D 9/042* (2013.01); *F05D 2230/60* (2013.01); *F05D 2240/12* (2013.01); *F05D 2240/80* (2013.01); *F05D 2260/30* (2013.01)

(58) Field of Classification Search
CPC .......... F01D 5/146; F01D 9/041; F01D 9/042; F01D 11/001; F01D 17/162; F01D 25/246; F04D 29/563; F04D 17/122; F05D 2230/60; F05D 2230/64; F05D 2230/644; F05D 2240/12; F05D 2240/80; F05D 2250/90; F05D 2260/30; F05D 2260/31

See application file for complete search history.

(56) References Cited

U.S. PATENT DOCUMENTS

| 4,363,600 | A  |   | 12/1982 | Thebert |
|-----------|----|---|---------|---------|
| 8,172,517 | B2 |   | 5/2012  | Lighty |
| 8,834,103 | B2 | * | 9/2014  | Hirokawa ............. F04D 29/563 |
|           |    |   |         | 415/160 |
| 9,303,524 | B2 |   | 4/2016  | Hensley et al. |
| 10,634,000 | B2 | * | 4/2020  | Skertic .................... F01D 17/20 |

(Continued)

FOREIGN PATENT DOCUMENTS

EP     1340894 A2     9/2003

OTHER PUBLICATIONS

The Extended European Search Report for Application No. 19186163. 2-1004; Report dated Dec. 16, 2019; 6 pages.

*Primary Examiner* — Ninh H. Nguyen
*Assistant Examiner* — Eric J Zamora Alvarez
(74) *Attorney, Agent, or Firm* — Cantor Colburn LLP

(57) ABSTRACT

A variable vane adjustment system for a gas turbine engine including: a vane platform having a recess, a vane opening within the recess, and a set screw opening originating at a first wall of the recess and extending into the vane platform; a trunnion carrier having a base portion located at least partially within the recess, a bushing attached to the base portion, and an orifice that extends through the base portion and bushing, wherein the orifice is aligned with the vane opening; a variable vane having a vane stem, the vane stem extending through the vane opening and the orifice; and a set screw located at least partially within the set screw opening, the set screw being configured to longitudinally traverse the set screw opening as the set screw is rotated, wherein the set screw is configured to move the trunnion carrier and variable vane.

20 Claims, 5 Drawing Sheets

(56) References Cited

U.S. PATENT DOCUMENTS

| | | |
|---|---|---|
| 2008/0145206 A1 | 6/2008 | Lighty |
| 2017/0002676 A1* | 1/2017 | Sippel ................... F01D 11/08 |
| 2017/0211410 A1 | 7/2017 | Walker et al. |

* cited by examiner

SET SCREW GAP CONTROL BETWEEN FIXED AND VARIABLE VANES

STATEMENT OF FEDERAL SUPPORT

This invention was made with Government support awarded by the United States. The Government has certain rights in the invention.

BACKGROUND

The subject matter disclosed herein generally relates to variable vanes for variable vane actuation systems of gas turbine engines and, more particularly, to a method and apparatus for adjusting the distance between variable vanes and blades of a gas turbine engine.

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Vanes are provided between rotating blades in the compressor and turbine sections. Moreover, vanes are also provided in the fan section. In some instances the vanes are movable to tailor flows to engine operating conditions. Variable vanes are mounted about a pivot and are attached to an arm that is in turn actuated to adjust each of the vanes of a stage. A specific rotation of the vane is required to assure that each vane in a stage is adjusted as desired to provide the desired engine operation.

The vanes may be adjacent to rotating blades and the interactions of the airflow between the vanes and the rotating blades may vary aerodynamic characteristics of airflow through the engine.

SUMMARY

According to an embodiment, a variable vane adjustment system for a gas turbine engine is provided. The variable vane adjustment system including: a vane platform having a recess, a vane opening within the recess, and a set screw opening originating at a first wall of the recess and extending into the vane platform; a trunnion carrier having a base portion located at least partially within the recess, a bushing attached to the base portion, and an orifice that extends through the base portion and the bushing, wherein the orifice is aligned with the vane opening; a variable vane having a vane stem, the vane stem extending through the vane opening of the vane platform and the orifice of the trunnion carrier; and a set screw located at least partially within the set screw opening, the set screw being configured to longitudinally traverse the set screw opening as the set screw is rotated, wherein the set screw is configured to project into the recess and impact the base portion of the trunnion carrier to move the trunnion carrier and the variable vane in a forward direction or aft direction.

In addition to one or more of the features described herein, or as an alternative, further embodiments may include that the first wall of the recess is an aft wall.

In addition to one or more of the features described herein, or as an alternative, further embodiments may include that the first wall of the recess is a forward wall.

In addition to one or more of the features described herein, or as an alternative, further embodiments may include that the set screw opening extends from the first wall of the recess to an aft side of the vane platform.

In addition to one or more of the features described herein, or as an alternative, further embodiments may include that the set screw opening extends from the first wall of the recess to a forward side of the vane platform.

In addition to one or more of the features described herein, or as an alternative, further embodiments may include: a biasing mechanism located at a second wall of the recess opposite the first wall, the biasing mechanism at least partially projecting into the recess.

In addition to one or more of the features described herein, or as an alternative, further embodiments may include that the second wall of the recess is an aft wall.

In addition to one or more of the features described herein, or as an alternative, further embodiments may include that the second wall of the recess is a forward wall.

In addition to one or more of the features described herein, or as an alternative, further embodiments may include that the biasing mechanism is located at least partially within a biasing mechanism opening originating at the second wall and extending into the vane platform.

In addition to one or more of the features described herein, or as an alternative, further embodiments may include that the biasing mechanism is a spring.

In addition to one or more of the features described herein, or as an alternative, further embodiments may include that the biasing mechanism is attached to the second wall.

According to another embodiment, a method of assembling a variable vane adjustment system for a gas turbine engine is provided. The method including: inserting a set screw at least partially into a set screw opening originating at a first wall of a recess within a vane platform, the set screw opening extending from the first wall into the vane platform, wherein the set screw is configured to longitudinally traverse the set screw opening as the set screw is rotated; inserting a trunnion carrier at least partially into the recess of the vane platform, the trunnion carrier having a base portion located at least partially within the recess, a bushing attached to the base portion, and an orifice that extends through the base portion and the bushing; wherein the base portion is configured to fit at least partially within the recess of the vane platform; aligning the orifice of the trunnion carrier with a vane opening located within the recess of the vane platform; inserting a vane stem of a variable vane through the vane opening of the vane platform and the orifice of the trunnion carrier; rotating the set screw at least partially within the set screw opening to move the set screw towards or away from the base portion of the trunnion carrier; and adjusting the position of the trunnion carrier and the blade using the set screw by rotating the set screw to at least partially project into the recess and impact the base portion of the trunnion carrier to move the trunnion carrier and the variable vane in a forward direction or aft direction.

In addition to one or more of the features described herein, or as an alternative, further embodiments may include that the first wall of the recess is an aft wall.

In addition to one or more of the features described herein, or as an alternative, further embodiments may include that the first wall of the recess is a forward wall.

In addition to one or more of the features described herein, or as an alternative, further embodiments may include that the set screw opening extends from the first wall of the recess to an aft side of the vane platform.

In addition to one or more of the features described herein, or as an alternative, further embodiments may include that the set screw opening extends from the first wall of the recess to a forward side of the vane platform.

In addition to one or more of the features described herein, or as an alternative, further embodiments may include: operably connecting a biasing mechanism to the vane platform, wherein the biasing mechanism is located at a second wall of the recess opposite the first wall and at least partially projects into the recess.

In addition to one or more of the features described herein, or as an alternative, further embodiments may include that the second wall of the recess is an aft wall.

In addition to one or more of the features described herein, or as an alternative, further embodiments may include that the second wall of the recess is a forward wall.

In addition to one or more of the features described herein, or as an alternative, further embodiments may include that the biasing mechanism is located at least partially within a biasing mechanism opening originating at the second wall and extending into the vane platform.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
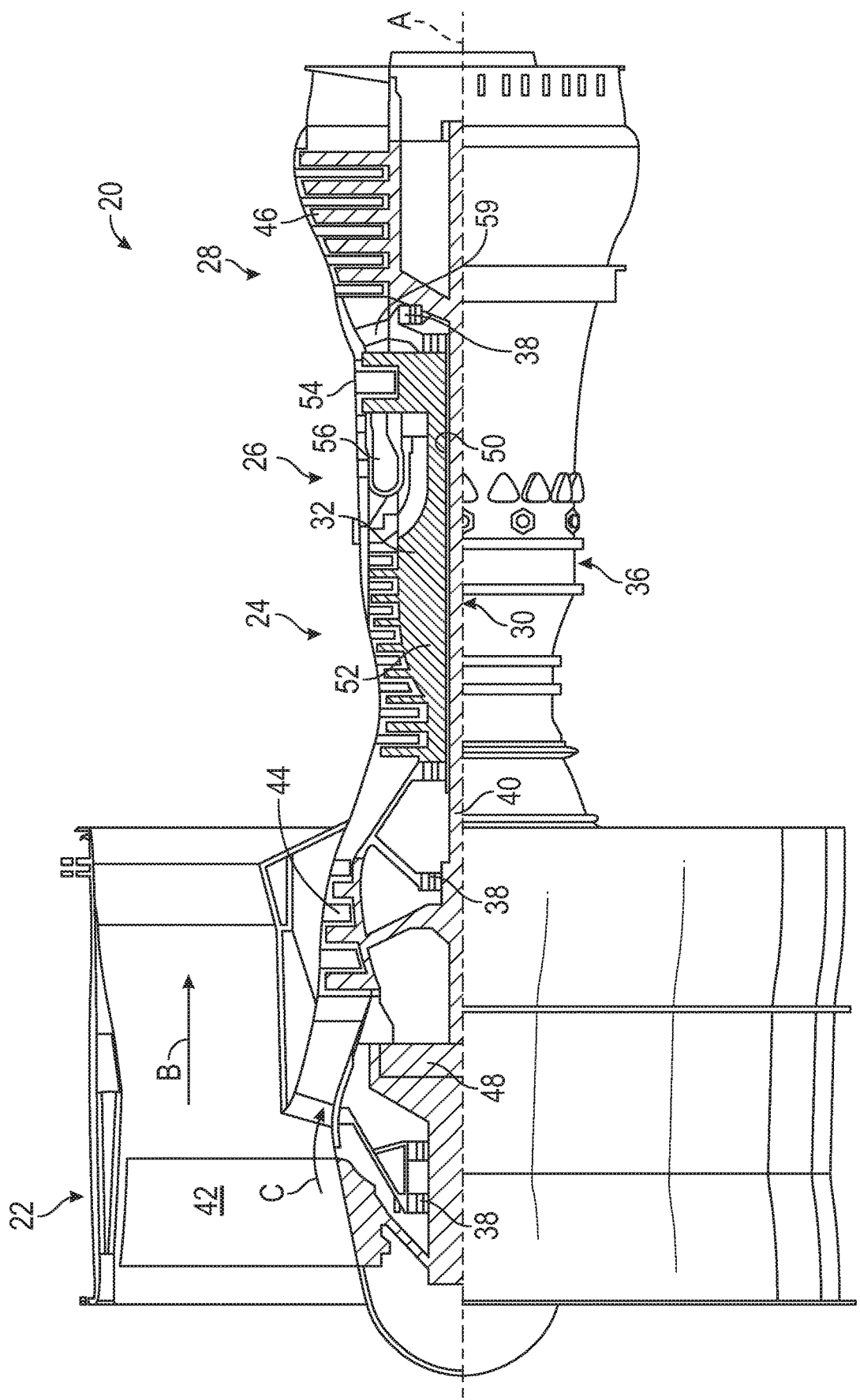
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{R})/(518.7° \text{R})]^{0.5}$. The "Low corrected fan tip speed" as disclosed herein according to one non-limiting embodiment is less than about 1150 ft/second (350.5 m/sec).

Figure 2:
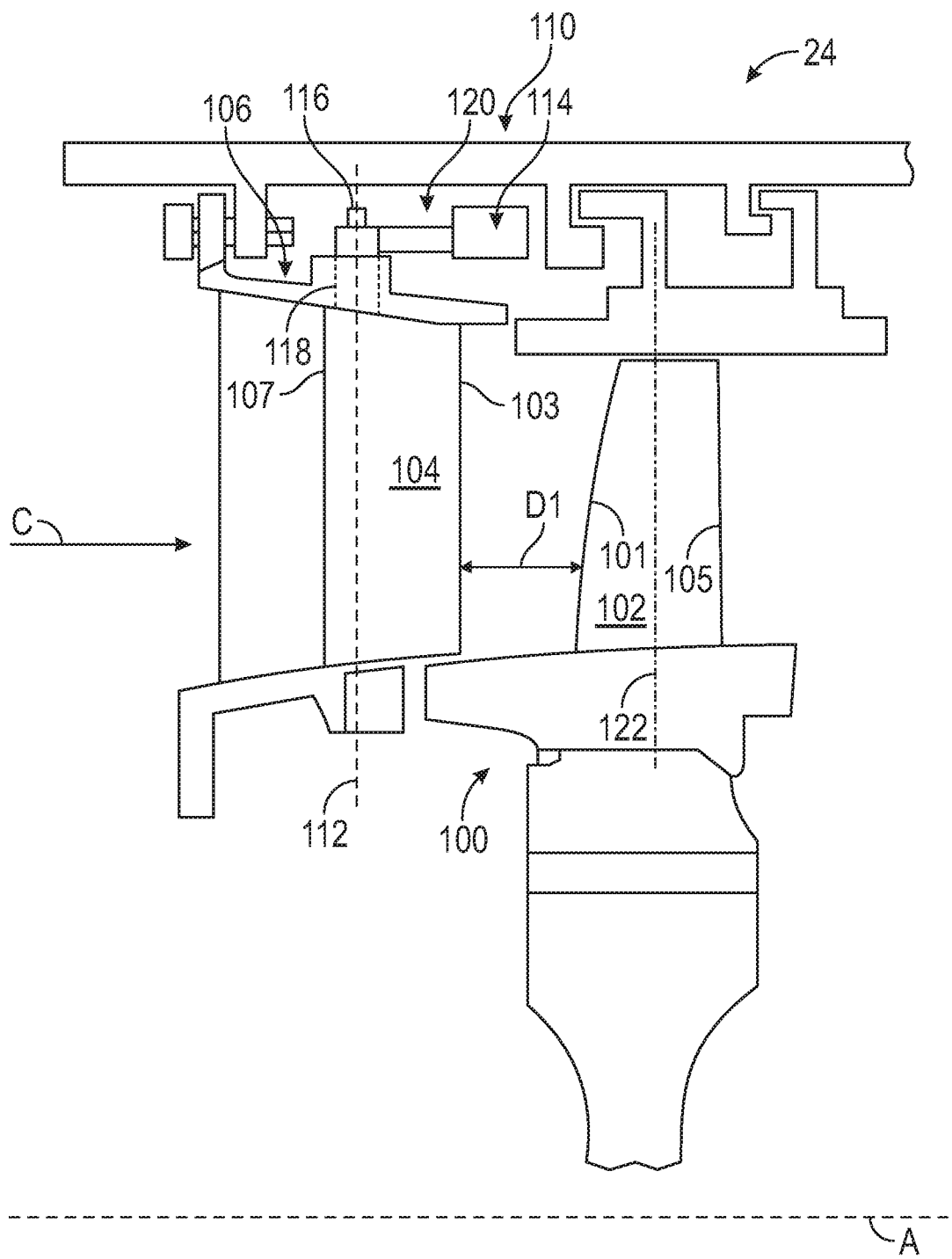
FIG. 2 illustrates a cross-section of a compressor section of the gas turbine engine, in accordance with an embodiment of the disclosure.

FIG. 2 illustrates a cross-sectional view of a portion of the compressor section 24, which may reside in the low pressure compressor 44 or the high pressure compressor 52. Further, while the embodiments disclosed herein are described in the context of the compressor section 24, the present disclosure may be applied to the turbine section 28. The compressor section 24 includes a compressor rotor 100 that is rotatable about the engine central longitudinal axis A and includes one or more stages or circumferentially extending rows of blades 102. The compressor section 24 further includes one or more vane stages 110 each including a circumferentially extending row of variable vanes 104, in an axially alternating arrangement with the blades 102. The variable vanes 104 and blades 102 are disposed inside a compressor case 106. One or more of the vane stages 110 are variable-pitch vane stages 110 such that each variable vane 104 is rotatable about a vane axis 112. The blades 102 rotate circumferentially around the engine central longitudinal axis A. The blades 102 do not rotate around a blade axis 122. Due to the rotatable nature of the variable vane 104 about the vane axis 112 a distance D1 measured between the variable vane 104 and the blade 102 may vary. The distance D1 may be measured between the leading edge 101 of the blade 102 and the trailing edge 103 of the variable vane 104. The distance D1 may also be measured between the trailing edge 105 of the blade 102 and the leading edge 107 of the variable vane 104.

To accomplish the desired uniform rotation of the variable vane 104 about the vane axis 112, the variable vanes 104 are connected to a synchronization ring 114, such that circumferential movement of the synchronization ring 114 about the engine central longitudinal axis A urges movement of each of the variable vanes 104 about their respective vane axes 112. In the embodiment of FIG. 2, each variable vane 104 includes a vane stem 116 extending through a vane opening 118 in the compressor case 106. A vane platform 120 may be attached to the compressor case 106 (see FIGS. 3 and 4), as discussed further below. The vane platform 120 is a removable platform that may be integral to the fixed vane 102 that is installed into the compressor case 106. Outside of the compressor case 106, each vane stem 116 is connected to synchronization ring 114 via a vane arm 120. Rotation of the vane stem 116 by the vane arm 120 rotates the variable vane 104.

Figure 3:
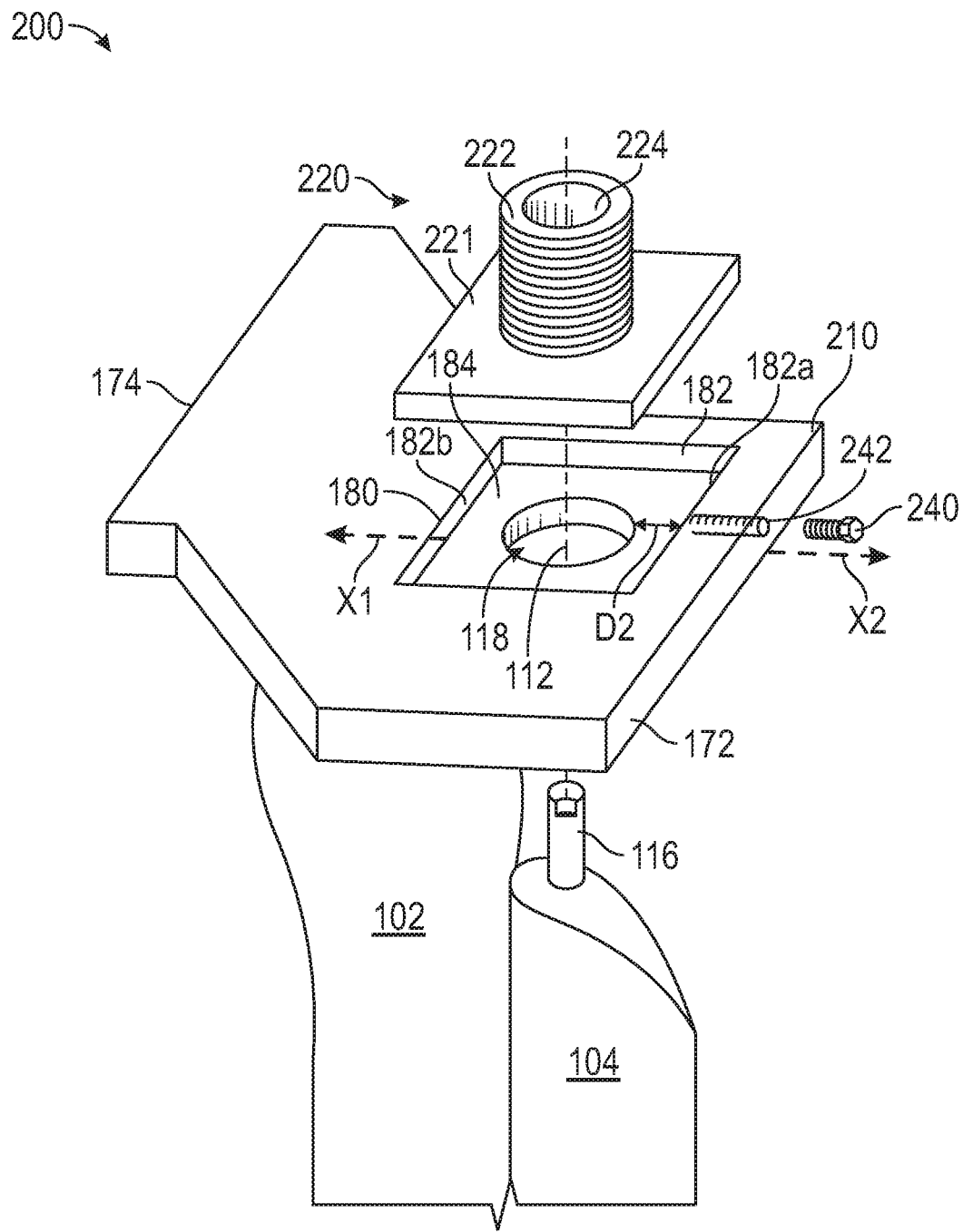
FIG. 3 illustrates an exploded view of a variable vane adjustment system, in accordance with an embodiment of the disclosure.

Referring now to FIG. 3 with continued reference to FIGS. 1-2. FIG. 3 illustrates a view of variable vane adjustment system 200 for a variable vane 104, according to an embodiment of the present disclosure. The variable vane adjustment system 200 includes a trunnion carrier 220, as shown in FIG. 3. The trunnion carrier 220 includes a base portion 221 that is configured to fit within a recess 180 located within the vane platform 210. The base portion 221 and the recess 180 may have complimentary shapes, such that the base portions 221 fits into the recess 180 like a puzzle piece. The base portion 221 and the recess 180 may each have a square shape. The recess 180 may have four side walls 182 and a bottom base 184. The square shape of the base portion 221 is smaller than the square shape of the recess 180, so that the base portion 221 will fit within the recess 180. There is some room (i.e., play) for the base portion 221 to move within the recess 180 in the forward direction X1 and the aft direction X2. The fit of the base portion 221 within the recess 180 restricts motion of the base portion 221 in a direction perpendicular to the forward direction X1 and the aft direction X2, such that, the base portion 221 may exhibit little to no motion in the direction perpendicular to the forward direction X1 and the aft direction X2. The trunnion carrier 220 also includes an orifice 224 that extends through the base portion 221 and the bushing 222. The vane stem 116 of the variable vane 104 extends through a vane opening 118 in the vane platform 210, and through the orifice 224 of the trunnion carrier 220.

The variable vane adjustment system 200 includes a set screw 240 that is inserted into a set screw opening 242 from an aft side 172 of the vane platform 210. The set screw opening 242 may extend from the aft side 172 of the vane platform 210 to the recess 180 within the vane platform 210. In other embodiments, the set screw opening 242 may also extend from a forward side 174 of the vane platform 210 to the recess 180 of the vane platform 210. In another embodiment, the set screw opening 242 may be a blind hole extending from an aft wall 182a or a forward wall 182b into the vane platform 210. The set screw 240 is configured to project into the recess 180 and impact the base portion 221 of the trunnion carrier 220 to move the trunnion carrier 220 and the variable vane 104 in a forward direction X1 or an aft direction X2. The screw 240 projects into the recess 180 a projection distance D2 as measured away from a wall 182 of the recess 180. As shown in FIG. 3, the screw 240 may project into the recess 180 away from an aft wall 182a of the recess 180.

Figure 4:
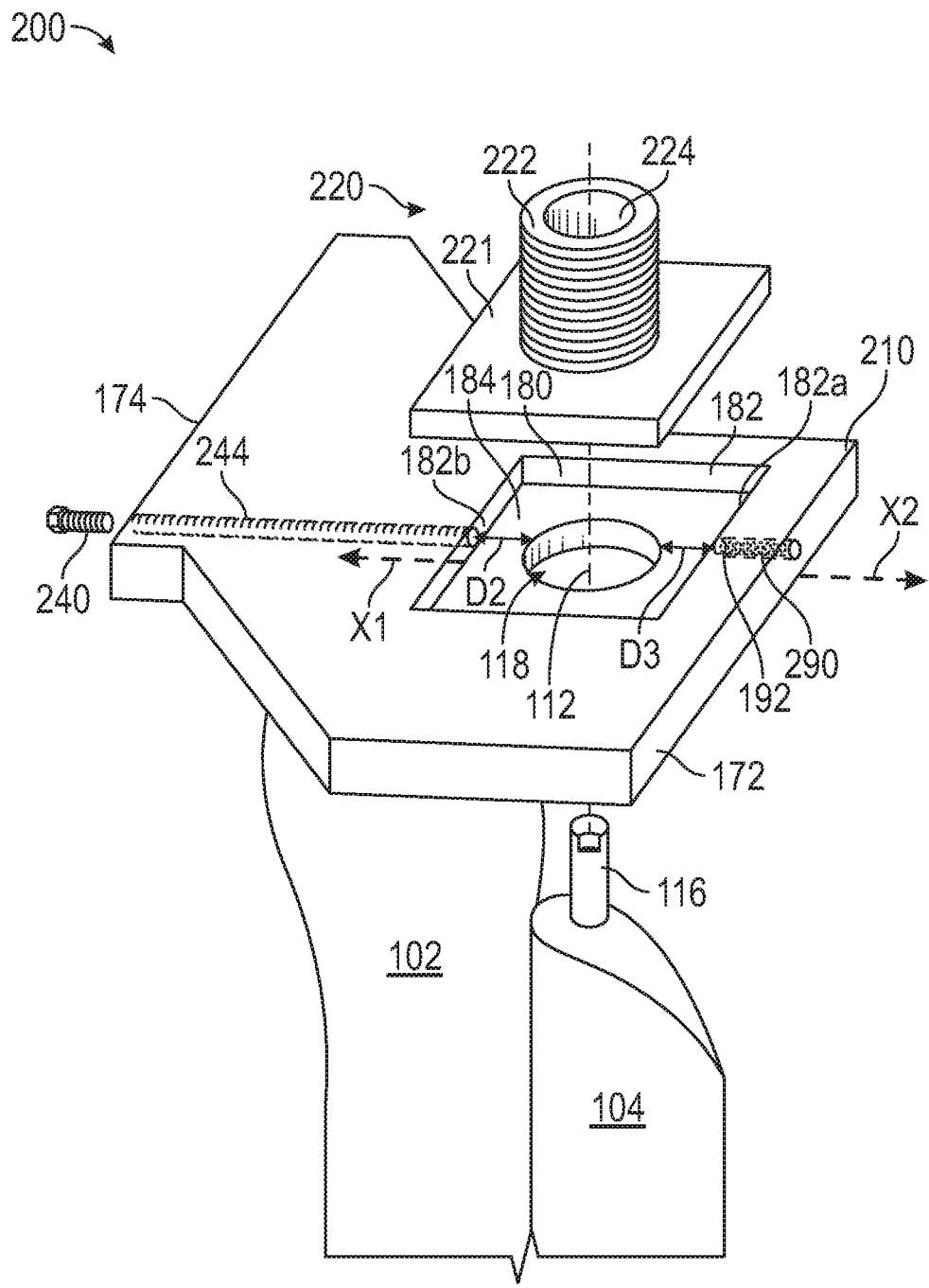
FIG. 4 illustrates an exploded view of a variable vane adjustment system, in accordance with an embodiment of the disclosure.

Referring now to FIG. 4 with continued reference to FIGS. 1-2. FIG. 4 illustrates a view of variable vane adjustment system 200 for a variable vane 104, according to an embodiment of the present disclosure. The variable vane adjustment system 200 includes a trunnion carrier 220, as shown in FIG. 4. The trunnion carrier 220 includes a base portion 221 that is configured to fit within a recess 180 located within the vane platform 210. The base portion 221 and the recess 180 may have complimentary shapes, such that the base portions 221 fits into the recess 180 like a puzzle piece. The base portion 221 and the recess 180 may each have a square shape. The recess 180 may have four side walls 182 and a bottom base 184. The square shape of the base portion 221 is smaller than the square shape of the recess 180, so that the base portion 221 will fit within the recess 180. There is some room (i.e., play) for the base portion 221 to move within the recess 180 in the forward direction X1 and the aft direction X2. The fit of the base portion 221 within the recess 180 restricts motion of the base portion 221 in a direction perpendicular to the forward direction X1 and the aft direction X2, such that, the base portion 221 may exhibit little to no motion in the direction perpendicular to the forward direction X1 and the aft direction X2. The trunnion carrier 220 also includes an orifice 224 that extends through the base portion 221 and the bushing 222. The vane stem 116 of the variable vane 104 extends through a vane opening 118 in the vane platform 210, and through the orifice 224 of the trunnion carrier 220.

The variable vane adjustment system 200 includes a set screw 240 that is inserted into a set screw opening 244 from a forward side 174 of the vane platform 210. The set screw opening 244 may extend from the forward side 174 of the vane platform 210 to the recess 180 within the vane platform 210. In other embodiments, the set screw opening 244 may also extend from an aft side 172 of the vane platform 210 to the recess 180 of the vane platform 210. In another embodiment, the set screw opening 244 may be a blind hole extending from an aft wall 182a or a forward wall 182b into the vane platform 210. The set screw 240 is configured to project into the recess 180 and impact the base portion 221 of the trunnion carrier 220 to move the trunnion carrier 220 and the variable vane 104 in a forward direction X1 or an aft direction X2. The screw 240 projects into the recess 180 a projection distance D2 as measured away from a wall 182 of the recess 180. As shown in FIG. 4, the screw 240 may project into the recess 180 away from a forward wall 182b of the recess 180.

A biasing mechanism 290 may be located at an aft wall 182a opposite the forward wall 182b of the recess 180. In an embodiment, the biasing mechanism 290 is a spring. The biasing mechanism 290 is configured to counter balance the force applied by the set screw 240 on the base portion of the trunnion carrier 220. The biasing mechanism 290 may be located on the aft wall 182a or within a biasing mechanism opening 192.

The biasing mechanism opening 192 may extend from the aft side 172 of the vane platform 210 to the recess 180 within the vane platform 210. The biasing mechanism opening 192 may also be a blind hole originating from the aft side 182a of the recess 180 and extending into the vane platform 210 towards the aft side 172 of the vane platform. In other embodiments not shown, the biasing mechanism opening 192 may extend from the forward side 174 of the vane platform 210 to the recess 180 within the vane platform 210. Also, in other embodiments not shown, the biasing mechanism opening 192 may also be a blind hole originating from the forward side 182b of the recess 180 and extending into the vane platform 210 towards the forward side 174 of the vane platform. The biasing mechanism 290 is configured to project into the recess 180 and impact the base portion 221 of the trunnion carrier 220 to push/pull the trunnion carrier 220 and the variable vane 104 in a forward direction X1 and/or an aft direction X2. The biasing mechanism projects into the recess 180 a projection distance D3 as measured away from a wall 182 of the recess 180.

Figure 5:
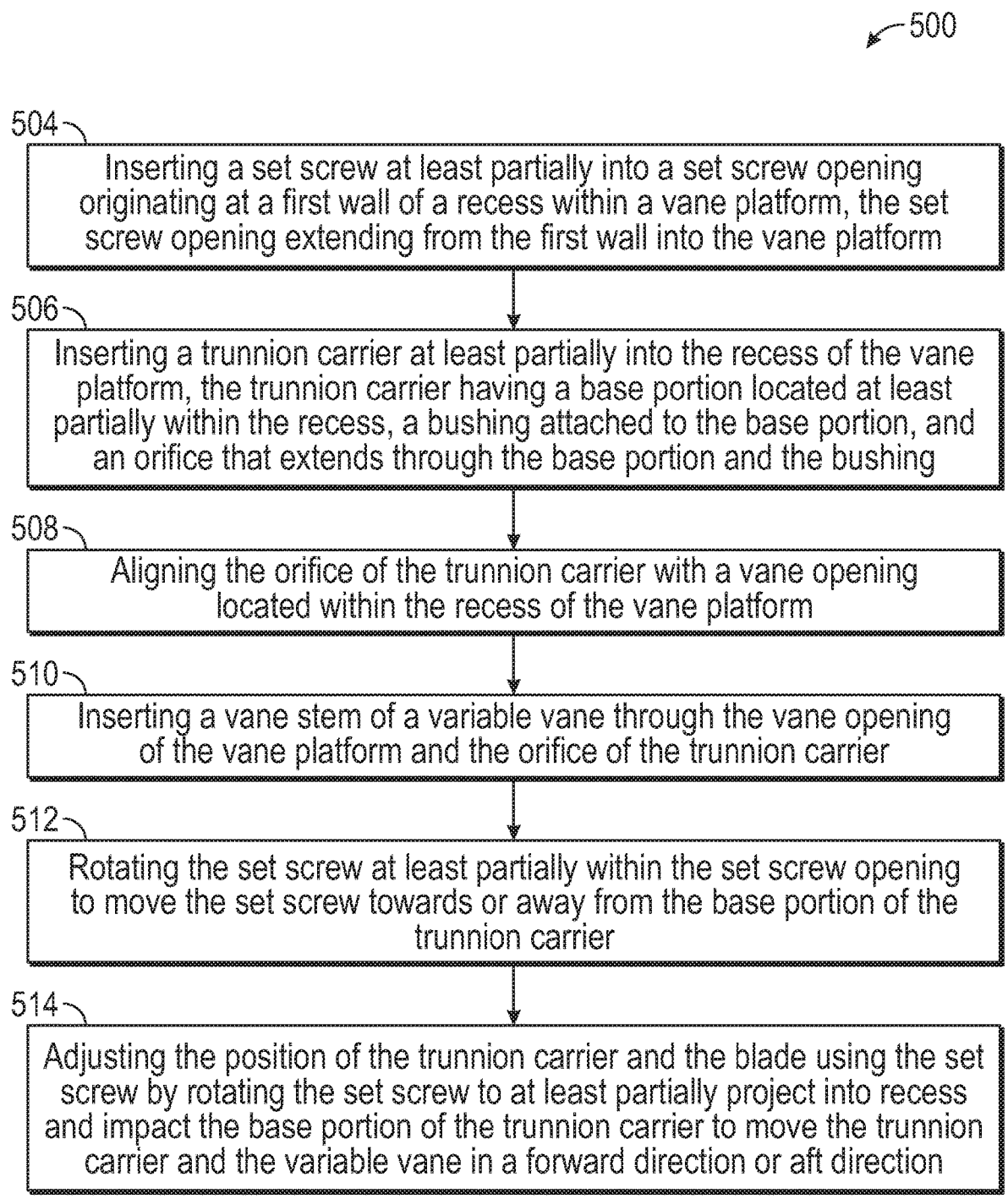
FIG. 5 is a diagram of a method of assembling a variable vane adjustment system, according to an embodiment of the present disclosure.

Referring now to FIG. 5 with continued reference to FIGS. 1-4. FIG. 5 illustrates a method of assembling a variable vane adjustment system 200. At block 504, a set screw 240 is inserted at least partially into a set screw opening 242, 244 originating at a first wall of a recess 180 within a vane platform 210. In an embodiment, the first wall of the recess 180 is an aft wall 182a. In another embodiment, the first wall of the recess 180 is a forward wall 182b. The set screw opening 242, 244 extends from the first wall into the vane platform 210. In an embodiment, the set screw opening 242 may extend from the first wall of the recess 180 to an aft side 172 of the vane platform 210 if the first wall is an aft wall 182a. In an embodiment, the set screw opening 244 may extend from the first wall of the recess 180 to a forward side 174 of the vane platform 210 if the first wall is a forward wall 182b. The set screw 240 is configured to longitudinally traverse the set screw opening 242, 244 as the set screw 240 is rotated.

At block 506, a trunnion carrier 220 is inserted at least partially into the recess 180 of the vane platform 210. The trunnion carrier 220 having a base portion 221 located at least partially within the recess 180, a bushing 220 attached to the base portion 222, and an orifice 224 that extends through the base portion 221 and the bushing 224. The base portion 221 is configured to fit at least partially within the recess 180 of the vane platform 210.

At block 508, the orifice 224 of the trunnion carrier 220 is aligned with a vane opening 118 located within the recess 180 of the vane platform 210. At block 510, a vane stem 115 of a variable vane 104 is inserted through the vane opening 118 of the vane platform 210 and the orifice 224 of the trunnion carrier 220.

At block 512, the set screw 240 is rotated at least partially within the set screw opening 242, 244 to move towards or away from the base portion 221 of the trunnion carrier 220. At block 514, the position of the trunnion carrier 220 and the variable vane 104 is adjusted using the set screw 240 by rotating the set screw 240 to at least partially project into the recess 180 and impact the base portion 221 of the trunnion carrier 220 to move the trunnion carrier 220 and the variable vane 104 in a forward direction X1 or aft direction X2.

The method 500 may further comprise: operably connecting a biasing mechanism 290 to the vane platform 210. The biasing mechanism 290 is located at a second wall of the recess opposite the first wall and may at least partially project into the recess 180. The second wall of the recess is opposite the location of the set screw opening 242, 242 and may be aft wall 182a or the forward wall 182b. The biasing mechanism 240 may be located at least partially within a biasing mechanism opening 192 originating at the second wall and extending into the vane platform 210.

While the above description has described the flow process of FIG. 5 in a particular order, it should be appreciated that unless otherwise specifically required in the attached claims that the ordering of the steps may be varied.

Technical effects of embodiments of the present disclosure include adjusting a location of a variable vane using a set screw.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A variable vane adjustment system for a gas turbine engine, comprising:
    a vane platform having a recess, a vane opening within the recess, and a set screw opening originating at a first wall of the recess and extending into the vane platform;
    a trunnion carrier having a base portion located at least partially within the recess, a bushing attached to the base portion, and an orifice that extends through the base portion and the bushing, wherein the orifice is aligned with the vane opening;
    a variable vane having a vane stem, the vane stem extending through the vane opening of the vane platform and the orifice of the trunnion carrier; and
    a set screw located at least partially within the set screw opening, the set screw being configured to longitudinally traverse the set screw opening as the set screw is rotated, wherein the set screw is configured to project into the recess and impact the base portion of the trunnion carrier to move the trunnion carrier and the variable vane in a forward direction or aft direction.

2. The variable vane adjustment system of claim 1, wherein the first wall of the recess is an aft wall.

3. The variable vane adjustment system of claim 1, wherein the first wall of the recess is a forward wall.

4. The variable vane adjustment system of claim 2, wherein the set screw opening extends from the first wall of the recess to an aft side of the vane platform.

5. The variable vane adjustment system of claim 3, wherein the set screw opening extends from the first wall of the recess to a forward side of the vane platform.

6. The variable vane adjustment system of claim 1, further comprising:
    a biasing mechanism located at a second wall of the recess opposite the first wall, the biasing mechanism at least partially projecting into the recess.

7. The variable vane adjustment system of claim 6, wherein the second wall of the recess is an aft wall.

8. The variable vane adjustment system of claim 6, wherein the second wall of the recess is a forward wall.

9. The variable vane adjustment system of claim 6, wherein the biasing mechanism is located at least partially within a biasing mechanism opening originating at the second wall and extending into the vane platform.

10. The variable vane adjustment system of claim 6, wherein the biasing mechanism is a spring.

11. The variable vane adjustment system of claim 6, wherein the biasing mechanism is attached to the second wall.

12. A method of assembling a variable vane adjustment system for a gas turbine engine, comprising:
    inserting a set screw at least partially into a set screw opening originating at a first wall of a recess within a vane platform, the set screw opening extending from the first wall into the vane platform, wherein the set screw is configured to longitudinally traverse the set screw opening as the set screw is rotated;
    inserting a trunnion carrier at least partially into the recess of the vane platform, the trunnion carrier having a base portion located at least partially within the recess, a bushing attached to the base portion, and an orifice that extends through the base portion and the bushing; wherein the base portion is configured to fit at least partially within the recess of the vane platform;
    aligning the orifice of the trunnion carrier with a vane opening located within the recess of the vane platform;
    inserting a vane stem of a variable vane through the vane opening of the vane platform and the orifice of the trunnion carrier;
    rotating the set screw at least partially within the set screw opening to move the set screw towards or away from the base portion of the trunnion carrier; and
    adjusting the position of the trunnion carrier and the variable vane using the set screw by rotating the set screw to at least partially project into the recess and impact the base portion of the trunnion carrier to move the trunnion carrier and the variable vane in a forward direction or aft direction.

13. The method of claim 12, wherein the first wall of the recess is an aft wall.

14. The method of claim 12, wherein the first wall of the recess is a forward wall.

15. The method of claim 13, wherein the set screw opening extends from the first wall of the recess to an aft side of the vane platform.

16. The method of claim 14, wherein the set screw opening extends from the first wall of the recess to a forward side of the vane platform.

17. The method of claim 12, further comprising:
    operably connecting a biasing mechanism to the vane platform, wherein the biasing mechanism is located at a second wall of the recess opposite the first wall and at least partially projects into the recess.

18. The method of claim 17, wherein the second wall of the recess is an aft wall.

19. The method of claim 17, wherein the second wall of the recess is a forward wall.

20. The method of claim 17, wherein the biasing mechanism is located at least partially within a biasing mechanism opening originating at the second wall and extending into the vane platform.

* * * * *